UNITED STATES PATENT OFFICE.

WILLIAM F. ROSSMAN, OF ST. LOUIS, MISSOURI, ASSIGNOR TO AMERICAN ZINC, LEAD & SMELTING COMPANY, OF ST. LOUIS, MISSOURI, A CORPORATION OF MAINE.

MAKING OF ZINC RETORTS AND OTHER REFRACTORY SHAPES.

1,424,120.   Specification of Letters Patent.   Patented July 25, 1922.

No Drawing.   Application filed May 16, 1921.   Serial No. 470,102.

*To all whom it may concern:*

Be it known that I, WILLIAM F. ROSSMAN, a citizen of the United States, residing at the city of St. Louis and State of Missouri, have invented a new and useful Improvement in the Making of Zinc Retorts and Other Refractory Shapes, of which the following is a specification.

This invention relates to zinc retorts and other refractory shapes.

An object of the invention is to produce a zinc retort or the like of a highly refractory substance which may be easily given the proper shape and form and which is capable of resisting the intense heat to which the articles are subjected and which is otherwise so strong and durable that the life of the retorts in use is greatly prolonged.

For the attainment of the foregoing and other objects and advantages my invention comprises a novel composition of matter including ingredients combined in about the proportions hereinafter described.

I have produced zinc retorts of such a refractory and durable nature that they have been kept in use satisfactorily nearly double the period of time that the retorts heretofore commonly used will endure.

In the composition for making the retorts I have used satisfactorily two parts of plastic clay, one part of finely ground silica, and one part of grog. The grog consists of ground burnt fire clay or fire clay material.

The burnt fire clay or fire clay material is provided so that it will pass through a wire screen having an approximate aperture of one-tenth of an inch, and the silica is provided that it will pass through a screen of about one hundred mesh.

These ingredients are mixed together in about the proportions stated, and the mixture is rendered plastic by the addition of water. While in a plastic state the mixture is shaped to form a retort having walls of the desired thickness and length and then dried before being placed in use in a furnace. The retorts are subjected to a drying process for about three months, more or less, before being placed in use.

Zinc retorts thus constructed from this mixture have been used in actual service over periods of from forty-five to fifty days which is about double the period that ordinary zinc retorts will last under the same conditions. The mechanical strength of retorts made of this material is much greater than the mechanical strength of ordinary zinc retorts. Retorts made of this composition or material do not bend or sag, materially, as do ordinary retorts under the same conditions.

If the silica be materially coarser than that mentioned, the same beneficial results are not obtained.

I do not restrict myself to unessential limitations, but what I claim and desire to secure by Letters Patent, is:—

1. A refractory material for zinc retorts and the like, composed of plastic clay, a proportion of finely pulverized silica, less than the proportion of clay, and a proportion of ground grog about equal to the proportion of silica mixed together in a plastic state.

2. A refractory material for zinc retorts and the like, comprising two parts of plastic clay, one part finely ground silica, and one part ground grog mixed together in a plastic state.

3. A refractory material for zinc retorts and the like, comprising two parts of plastic clay, one part of silica ground to fineness to pass through a one-hundred mesh screen, and one part of grog ground to fineness to pass through a square aperture of about one-tenth of an inch.

4. A zinc retort composed of two parts of plastic clay, one part of silica ground to a fineness to pass through one-hundred mesh screen, and one part of grog ground to a fineness to pass through a screen having apertures of about one-tenth of an inch.

WILLIAM F. ROSSMAN.